United States Patent [19]

Nickell

[11] 4,075,078

[45] Feb. 21, 1978

[54] SURVIVAL KIT CONTAINER

[76] Inventor: Joe H. Nickell, c/o J. Wendell Nickell P.O. Box 67, West Liberty, Ky. 41472

[21] Appl. No.: 757,340

[22] Filed: Jan. 6, 1977

[51] Int. Cl.² .............................................. A45C 11/20
[52] U.S. Cl. ..................................... 206/546; 206/547
[58] Field of Search ................................. 206/546, 547

[56] References Cited

U.S. PATENT DOCUMENTS

| 888,554 | 5/1908 | Tuttle | 206/546 |
| 1,373,156 | 3/1921 | Tebbetts | 206/546 |
| 1,535,954 | 4/1925 | Smith | 206/547 |

Primary Examiner—George T. Hall

[57] ABSTRACT

A survival kit container is used for containing items — such as first-aid, direction-finding, and food-supplying — for use in a survival emergency situation. My present invention is such a container so designed that emptied of its contents and its parts assembled in varying combinations becomes alternately a canteen flask, stew pot, kettle or skillet for use in survival-type emergencies.

3 Claims, 2 Drawing Figures

SURVIVAL KIT CONTAINER

SUMMARY OF THE INVENTION

My invention relates to a unique and novel improvement in survival equipment.

An object of my present invention is to provide a container for personal survival items.

A further object of my present invention is to provide a container that further functions when desired as a canteen flask for purifying and carrying water.

Another object of my present invention is to provide a container that further functions as a skillet for cooking.

Still another object of my present invention is to provide a container that further functions as a kettle for heating and pouring of liquids.

A still further object of my present invention is to provide a container that further functions as a stew pot for cooking.

Briefly, my present invention comprises a five-sided metallic container with a bottle-neck or pour-spout extending from one endwall. This spout is threaded and fitted with a metal cap so constructed that if turned end-for-end it converts to a short extention handle to the base container. A detachable wire handle also affixes to the base container and, alternately, a plastic or metal snap-on lid covers the large open top of the container to make a fully-enclosing box.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
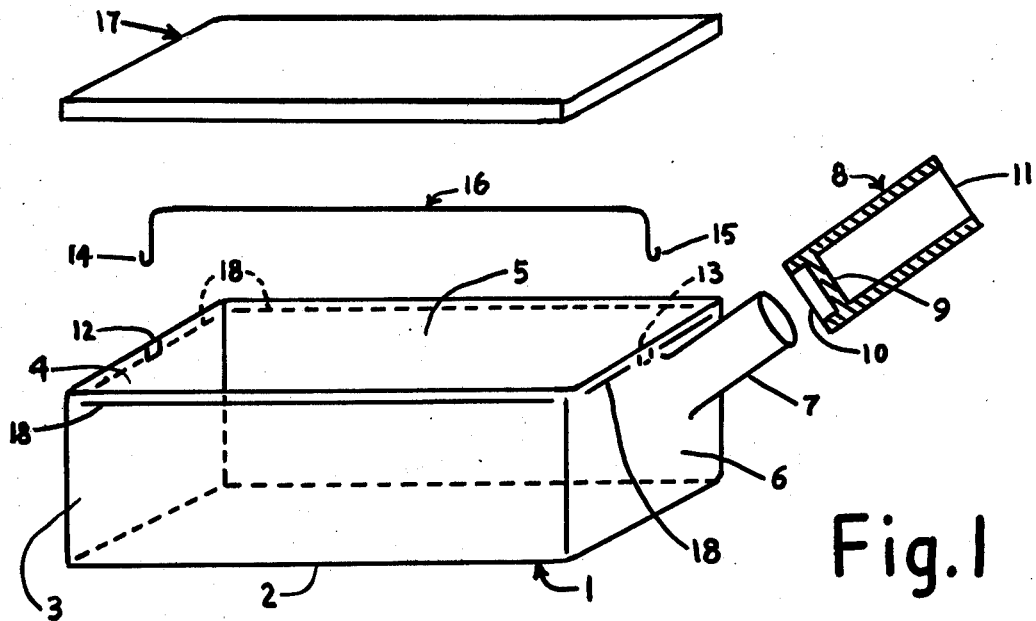
FIG. 1 illustrates an exploded perspective view of the container and its accessory components.

Turning now descriptively to the drawings, in which similar reference characters denote similar elements throughout the several views, FIG. 1 shows a metallic container 1 of one-piece construction formed into a base 2 with two upward extending sidewalls 3,5 and two upward extending endwalls 4,6 and open at the top. From one endwall 6 an exterior-threaded neck or spout 7 extends to receive an interior-threaded tube 8 (shown in cross section). Said tube 8 is hollow except for a partition 9 significantly closer to end 10. If said tube 8 is threaded onto the spout 7, said tube 8 becomes a short extention handle. The said base container 1 is also equipped with slots 12,13 suitable for engaging the ends 14,15 of the wire handle 16. A snap-on lid 17 fastens onto the upper edge of said container base 1 by means of a flange 18.

Figure 2:
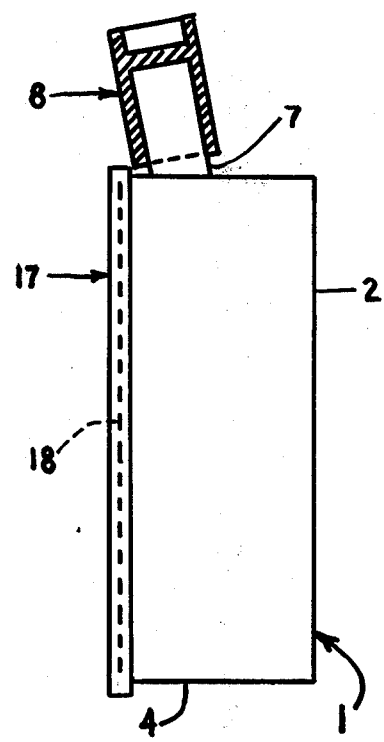
FIG. 2 illustrates an end view of the container assembled for carrying.

Referring now to FIG. 2, this is an end view of said container base 1 standing upright on endwall 4 with lid 17 affixed. Tube 8 has been turned so that end 11 is threaded onto the spout 7, capping same.

Hence, obvious changes may be made in the specific embodiment of the invention described herein, such modifications being within the spirit and scope of the invention claimed, it is intended that all matter contained herein is intended as an illustrative and not as limiting in scope.

Having thus described the invention, what I claim as new and desire to secure by Letters Patent of the United States is:

1. A survival kit container comprising a box-like body member having an open side and a closed side, with a pour spout extending at an upward angle from one endwall, said spout being fitted with a threaded tube having a partition closer to one end, the distance to the other end being the length of said spout, whereby said tube when threaded onto said spout serves as a screw-cap, and whereby the opposite end of said tube may alternately be threaded onto said spout for said tube to function as an extension handle when said body member is utilized as a skillet for cooking.

2. A survival kit container as recited in claim 1, said body member having a continuous flange circumscribing the outer surface of the sidewalls and endwalls near the open side of said body member, said continuous flange engaging a shallow box-like lid which, when so engaged, completely encloses said body member, wherein the area so enclosed may serve as a container for survival items or alternately as a container for carrying water and dispensing same by means of said spout.

3. A survival kit container as recited in claim 1, said body member having a slot in the inner face of each endwall near the open side of said body member, said slots thereby engaging the ends of a detachable wire handle by which, when attached, said body member can be utilized as a kettle, wherewith said spout can be used for pouring by uncapping said spout.

* * * * *